(12) United States Patent
Sudakov

(10) Patent No.: US 11,170,247 B2
(45) Date of Patent: Nov. 9, 2021

(54) DISPLAY APPARATUS AND TEXT RECOGNIZING METHOD THEREOF

(71) Applicant: SAMSUNG ELECTRONICS CO., LTD., Suwon-si (KR)

(72) Inventor: Sergei Sudakov, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 488 days.

(21) Appl. No.: 16/317,905

(22) PCT Filed: May 24, 2017

(86) PCT No.: PCT/KR2017/005383
§ 371 (c)(1),
(2) Date: Jan. 15, 2019

(87) PCT Pub. No.: WO2018/012729
PCT Pub. Date: Jan. 18, 2018

(65) Prior Publication Data
US 2021/0295084 A1     Sep. 23, 2021

(30) Foreign Application Priority Data

Jul. 14, 2016  (KR) .................. 10-2016-0089099

(51) Int. Cl.
*G06K 9/32* (2006.01)
*G06K 9/46* (2006.01)

(52) U.S. Cl.
CPC ......... *G06K 9/3266* (2013.01); *G06K 9/4638* (2013.01)

(58) Field of Classification Search
CPC ..... G06K 9/325; G06K 9/3266; G06K 9/4638
See application file for complete search history.

(56) References Cited

U.S. PATENT DOCUMENTS 9,706,154 B2   7/2017  Park et al.
10,075,666 B2  9/2018  Park et al.
(Continued)

FOREIGN PATENT DOCUMENTS

KR   10-2005-0116224 A   12/2005
KR   10-2006-0094006 A    8/2006
(Continued)

OTHER PUBLICATIONS

Sangheeta Roy et al., "Word Recognition in Natural Scene and Video Images using Hidden Markov Model", 2013 Fourth National Conference on Computer Vision, Pattern Recognition, Image Processing and Graphics (NCVPRIPG), Dec. 18, 2013-Dec. 21, 2013. (4 pages total).

(Continued)

*Primary Examiner* — Casey L Kretzer
(74) *Attorney, Agent, or Firm* — Sughrue Mion, PLLC

(57) ABSTRACT

Disclosed is a display apparatus. The display apparatus includes a communication interface that receives an image from an external electronic device, a display that displays the image, and a processor, wherein the processor generates a user interface (UI) mask including probability information that a plurality of areas included in the image correspond to a UI, by using a convolutional neural network (CNN) algorithm, identifies a UI area included in the image by using the UI mask, identifies a text area included in the UI area, and recognizes text included in the text area.

15 Claims, 11 Drawing Sheets

(56) References Cited

U.S. PATENT DOCUMENTS

| | | | | |
|---|---|---|---|---|
| 2008/0098433 A1* | 4/2008 | Hardacker | ..... | H04N 21/440236 725/52 |
| 2015/0042882 A1 | 2/2015 | Park et al. | | |
| 2017/0272683 A1 | 9/2017 | Park et al. | | |

FOREIGN PATENT DOCUMENTS

| | | | | |
|---|---|---|---|---|
| KR | 10-0903816 B1 | | 6/2009 | |
| KR | 10-2013-0071148 A | | 6/2013 | |
| KR | 10-1409340 B1 | | 6/2014 | |
| KR | 20130071148 A | * | 6/2019 | ........... G06K 9/3266 |

OTHER PUBLICATIONS

International Search Report (PCT/ISA/220), issued by International Searching Authority in corresponding International Application No. PCT/KR2017/005383, dated Aug. 21, 2017.

Written Opinion (PCT/ISA/237) issued by the International Searching Authority in corresponding International Application No. PCT/KR2017/004612, dated Aug. 18, 2017.

International Search Report (PCT/ISA/210), issued by International Searching Authority in corresponding International Application No. PCT/KR2017/005383, dated Aug. 21, 2017.

Luoting Fu et al. "From engineering diagrams to engineering models: Visual recognition and applications" Computer-Aided Design, vol. 43, 2011 (pp. 278-292).

Sangheeta Roy et al. "Word Recognition in Natural Scene and Video Images using Hidden Markov Model" (4 pages total), 2012 (current best estimate).

Tara N. Sainath et al. "Deep Convolutional Neural Networks for Large-scale Speech Tasks" Neural Networks, vol. 64, 2015 (pp. 39-48) available online Sep. 16, 2014.

Sonia Yousfi et al. "Deep Learning and Recurrent Connectionist-based Approaches for Arabic Text Recognition in Videos" 13th International Conference on Document Analysis and Recognition (ICDAR), 2015 (pp. 1026-1030).

* cited by examiner

DISPLAY APPARATUS AND TEXT RECOGNIZING METHOD THEREOF

TECHNICAL FIELD

The present disclosure relates to a display apparatus for recognizing text included in an image and a text recognizing method for the display apparatus.

BACKGROUND ART

As digital technology has been developed, various types of electronic products have been developed and distributed. Specially, as the electronic products have been multi-functionalized, products that can provide various services with a single device such as a smart phone have been introduced.

In addition, with the development of communication technology, services that can be provided in cooperation with electronic devices have been increased. For example, a display apparatus such as a TV may be connected to a peripheral electronic device such as a smart phone, a set-top box, a game console, or the like and may provide various contents received from the peripheral electronic device.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

When a display apparatus receives contents from a peripheral electronic device, the display apparatus may receive and display only an image without receiving information about the contents from the peripheral electronic device.

Accordingly, the display apparatus cannot acquire any information about the contents viewed by a user, and cannot provide a user interface (UI) or a user experience (UX) based on the content information.

Aspects of the present disclosure are to address at least the above-mentioned problems and/or disadvantages and to provide at least the advantages described below. Accordingly, an aspect of the present disclosure is to provide a display apparatus that is capable of recognizing text included in an image and obtaining information about contents even when the information about the contents is not received from a peripheral electronic device, and a text recognizing method thereof.

Technical Solution

In accordance with an aspect of the present disclosure, a display apparatus includes a communication interface that receives an image from an external electronic device, a display that displays the image, and a processor, wherein the processor generates a user interface (UI) mask including probability information that a plurality of areas included in the image correspond to a UI, by using a convolutional neural network (CNN) algorithm, identifies a UI area included in the image by using the UI mask, identifies a text area included in the UI area, and recognizes text included in the text area.

In accordance with another aspect of the present disclosure, a text recognizing method of a display apparatus includes receiving an image from an external electronic device through a communication interface, generating a user interface (UI) mask including probability information that a plurality of areas included in the image correspond to a UI, by using a convolutional neural network (CNN) algorithm, identifying a UI area included in the image by using the UI mask, identifying a text area included in the UI area, and recognizing text included in the text area.

In accordance with still another aspect of the present disclosure, a computer readable recording medium on which a program for performing a method is recorded, wherein the method includes receiving an image from an external electronic device through a communication interface, generating a UI mask including probability information that a plurality of areas included in the image correspond to a UI, by using a CNN algorithm, identifying a UI area included in the image by using the UI mask, identifying a text area included in the UI area, and recognizing text included in the text area.

Advantageous Effects of the Invention

According to various embodiments of the present disclosure, even when the information about contents is not received from a peripheral electronic device, the information about the contents may be obtained by recognizing the text included in the image without interworking with an external server.

In addition, the text may be recognized by using the template generated adaptively to a peripheral electronic device connected to the display apparatus, so that it is possible to not only improve the accuracy of text recognition but also reduce the amount of computation required for text recognition and the time required for text recognition.

Other aspects, advantages, and salient features of the disclosure will become apparent to those skilled in the art from the following detailed description, which, taken in conjunction with the annexed drawings, discloses various embodiments of the present disclosure.

DESCRIPTION OF THE DRAWINGS

The above and other aspects, features, and advantages of certain embodiments of the present disclosure will be more apparent from the following description taken in conjunction with the accompanying drawings, in which.

MODE FOR INVENTION

Figure 1:
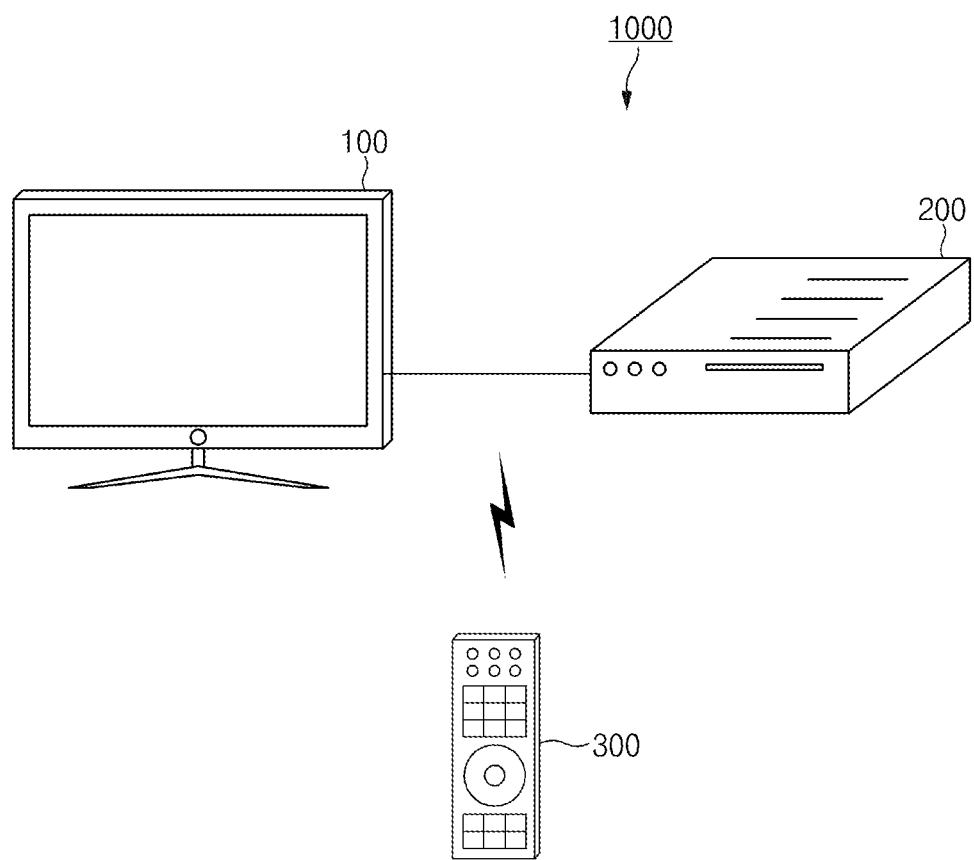
FIG. 1 is a view illustrating a display system according to various embodiments.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe specified embodiments of the present disclosure and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined herein in various embodiments of the present disclosure. In some cases, even if terms are terms which are defined in the disclosure, they may not be interpreted to exclude embodiments of the present disclosure.

FIG. 1 is a view illustrating a display system according to various embodiments.

Referring to FIG. 1, a display system 1000 may include a display apparatus 100, a content providing device 200, and a remote control device 300.

According to an embodiment, the display apparatus 100 may receive an image from an external device. For example, the display apparatus 100 may receive broadcasting contents from a broadcasting station through a broadcasting network or may receive web contents from a web server through Internet. As another example, the display apparatus 100 may be connected with the content providing device 200 through a wired communication interface (e.g., a high definition multimedia interface (HDMI) or a digital video/visual interactive (DVI), a video graphics array (VGA), or the like) or a local wireless communication interface (e.g., Bluetooth, near field communication (NFC), wireless-fidelity (Wi-Fi), or the like) and may receive an image from the content providing device 200. The image received from the content providing device 200 may include a UI image generated by the content providing device 200 as well as a content image. For example, the contents may include images such as movies, dramas, news, games, and the like.

According to an embodiment, the display apparatus 100 may be implemented with various devices that are capable of receiving and displaying contents from an external device such as a TV, a desktop, a notebook PC, a smart phone, a tablet PC, a monitor, an electronic frame, and the like.

According to an embodiment, the content providing device 200 may transmit the content image received from an external device or stored in an internal (or external) recording medium to the display apparatus 100. For example, the content providing device 200 may receive broadcasting contents from a broadcasting station through a broadcasting network or receive web contents from a web server through Internet. The content providing device 200 may reproduce the contents stored in the recording medium and transmit a content image to the display apparatus 100. For example, the recording medium may include a compact disk (CD), a digital versatile disc (DVD), a hard disk, a bluelay disk, a memory card, a USB memory, and the like.

According to an embodiment, the image transmitted from the content providing device 200 to the display apparatus 100 may include a UI image of the content providing device 200 as well as the content image. For example, the content providing device 200 may allow the UI image to overlap the content image and transmit the overlapped image to the display apparatus 100. For example, the UI image may include information about contents such as a content type, a content title, a broadcast channel, and the like.

According to an embodiment, the content providing device 200 may be implemented with various devices capable of receiving or storing contents, and transmitting contents to the display apparatus 100, such as a set-top box, a game console (e.g., Xbox™, PlayStation™, or the like), a smart phone, a tablet PC, and the like.

According to an embodiment, the remote control device 300 may receive a user input and transmit a control signal corresponding to the received user input to the display apparatus 100 or the content providing device 200. The remote control device 300 may communicate with the display apparatus 100 or the content providing device 200 through a short-range wireless communication interface such as a Bluetooth, NFC or IR transceiver. According to an embodiment, the remote control device 300 may include at least one button, a touch panel, a motion recognition sensor, or a voice recognition sensor for receiving a user input.

When displaying an image received from the content providing device, the display apparatus according to a comparative example may simply receive only an image without directly receiving information (e.g., a content type, a content title, a broadcast channel, and the like) about the contents from the content providing device. Accordingly, the display apparatus according to the comparative example may not obtain any information about the contents viewed by a user, and may not provide a user interface (UI) or a user experience (UX) based on the content information. However, even when the display apparatus 100 according to various embodiments does not receive the information about the contents from the content providing device 200, the display apparatus 100 may recognize the text included in the image without interworking with an external server itself, thereby obtaining the information about the contents.

Figure 2:
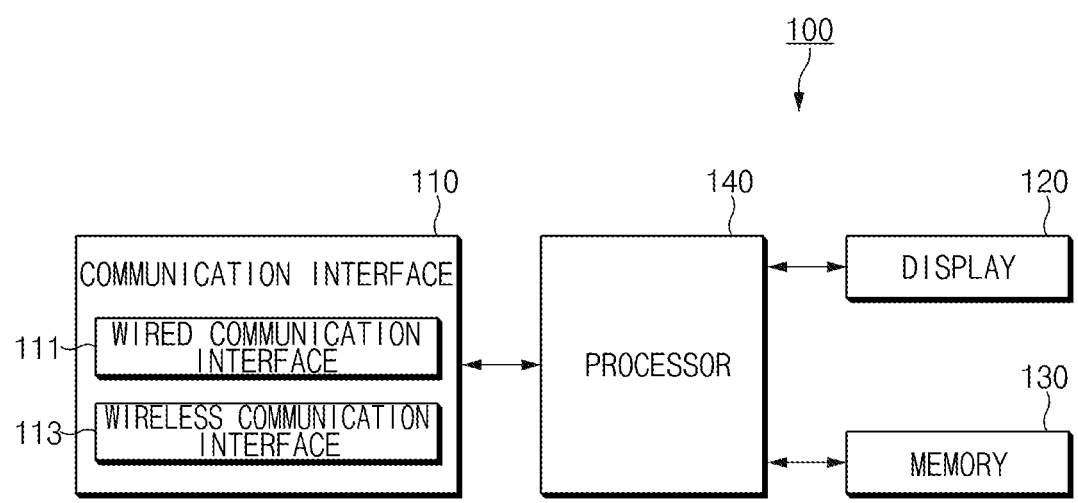
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 may include a communication interface 110, a display 120, a memory 130, and a processor 140.

The communication interface 110 may communicate with an external device. For example, the communication interface 110 may receive an image (e.g., a video image) from the content providing device 200. According to an embodiment, the communication interface 110 may include a wired communication interface 111 and a wireless communication interface 113. The image received from the content providing device 200 may include a UI image generated by the content providing device 200 as well as a content image.

The wired communication interface 111 may communicate with the content providing device 200 in a wired manner. For example, the wired communication interface 111 may be wired connected to the content providing device 200 to receive an image from the content providing device 200. The wired communication interface 111 may include, for example, an HDMI interface, a DVI interface, or a VGA interface.

The wireless communication interface 113 may wirelessly communicate with the content providing device 200 or the remote control device 300. For example, the wireless communication interface 113 may be wirelessly connected to the content providing device 200 to receive an image from the content providing device 200. As another example, the wireless communication interface 113 may be wirelessly connected to the remote control device 300 to transmit or receive a control signal. The wireless communication interface 113 may include, for example, a Bluetooth interface, an NFC interface, a Wi-Fi interface, or an IR interface.

The display 120 may display an image received from the content providing device 200. For example, the display 120 may display an image received from the content providing device 200 at a specified frame rate.

The memory 130 may store a template. For example, the memory 130 may store a UI template or a text template generated by the processor 140. For example, the memory 130 may be a nonvolatile memory such as a flash memory, a hard disk, or the like.

The processor 140 may control the overall operation of the display apparatus 100. For example, the processor 140 may control the communication interface 110, the display 120, and the memory 130, respectively, to recognize text included in a UI area of an image according to various embodiments.

According to an embodiment, the display apparatus 100 may include at least one processor 140. For example, the display apparatus 100 may include a plurality of processors 140 capable of performing at least one function. According to an embodiment, the processor 140 may be implemented with a system-on-chip (SoC) including a central processing unit (CPU), a graphics processing unit (GPU), a memory, and the like.

Figure 3:
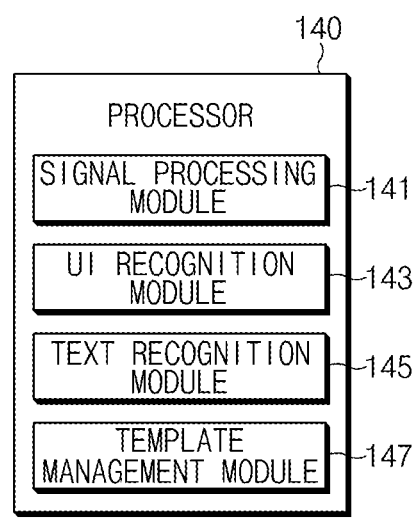
FIG. 3 is a block diagram illustrating a configuration of a processor according to various embodiments.

FIG. 3 is a block diagram illustrating a configuration of a processor according to various embodiments.

Referring to FIG. 3, the processor 140 may include a signal processing module 141, a user interface (UI) recognition module 143, a text recognition module 145, and a template management module 147. Each component of the processor 140 shown in FIG. 3 may be a separate hardware module or a software module implemented by at least one processor. For example, the function performed by each module included in the processor 140 may be performed by one processor or by a separate processor.

According to an embodiment, the signal processing module 141 may perform signal processing for the contents received from the content providing device 200 through the communication interface 110. For example, the signal processing module 141 may perform signal processing for an image (e.g., video data) included in the received content to generate a plurality of image frames. For example, the signal processing module 141 may include a decoder (not shown) for decoding the image included in the received contents, and a scaler (not shown) for performing up or down scaling corresponding to a screen size of the display 120. According to an embodiment, the signal processing module 141 may display the generated image frame on the display 120 corresponding to the frame rate of the display 120.

Figure 4:
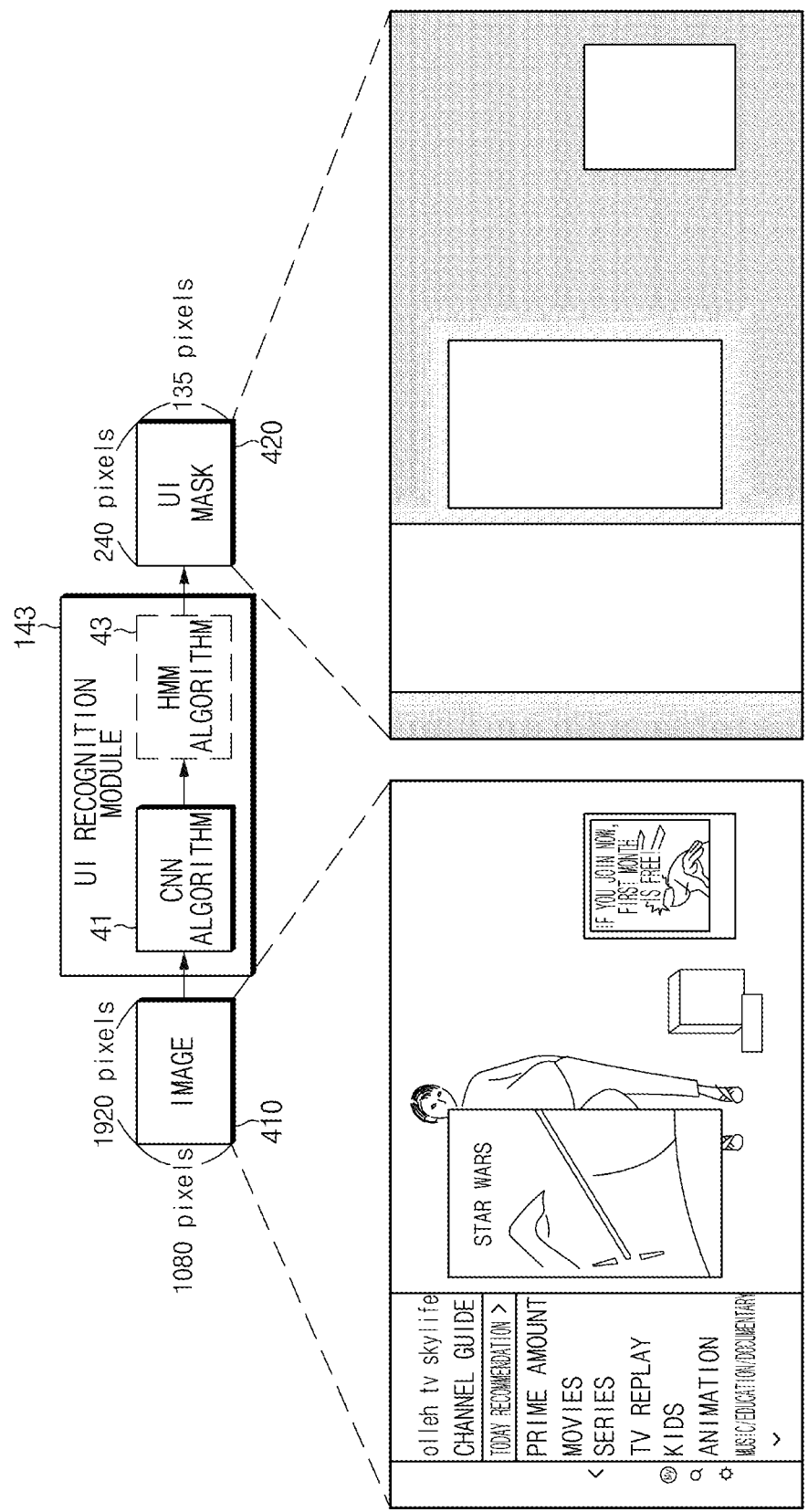
FIG. 4 is a view illustrating a UI mask generated according to various embodiments.

FIG. 4 is a view illustrating a UI mask generated according to various embodiments.

According to an embodiment, the UI recognition module 143 may generate a user interface (UI) mask 420 based on an image 410 received from the content providing device 200. According to an embodiment, the UI recognition module 143 may generate a UI mask by using the image frame generated by the signal processing module 141. For example, the UI recognition module 143 may generate the UI mask by using at least a part of a plurality of image frames successively generated by the signal processing module 141.

According to an embodiment, the UI recognition module 143 may generate the UI mask 420 by using a first algorithm. For example, referring to FIG. 4, the UI recognition module 143 may generate the UI mask 420 by using a convolutional neural network (CNN) algorithm 41. The CNN algorithm 41 may be an algorithm that analyzes the features included in the image through a convolutional layer and a pooling layer and classifies or recognizes an object corresponding to the features analyzed through a fully-connected layer. In general, the CNN algorithm 41 may determine whether the image corresponds to a specific object (e.g., whether a UI is included in the image). According to an embodiment, the UI recognition module 143 may use the CNN algorithm 41 to generate the UI mask 420 that includes probability information that a plurality of areas included in the image correspond to the UI. Each of the plurality of areas of the image 410 may correspond to each pixel of the UI mask 420.

According to an embodiment, the UI mask 420 generated by the UI recognition module 143 may have a smaller resolution (or size) than the original image 410. For example, when the original image 410 has a full high definition (FHD) resolution (e.g., 1920 pixels*1080 pixels), the UI recognition module 143 may generate the UI mask 420 having a resolution (e.g., 240 pixels*135 pixels) reduced by ⅛. The UI recognition module 143 may generate a reduced UI mask at various ratios such as ¼, 1/16, 1/32, 1/64, and the like as well as ⅛ of the image, or may generate a UI mask having a fixed resolution without regard to the resolution of the original image.

According to an embodiment, the UI mask 420 generated by the UI recognition module 143 may include probability information that the plurality of areas included in the image 410 correspond to a UI. For example, referring to FIG. 4, the brightness of the UI mask 420 may vary depending on the probability information included in the UI mask 420. For example, an area having a high probability to correspond to a UI may be relatively bright, and an area having a low probability to correspond to a UI may be relatively dark.

According to an embodiment, the UI recognition module 143 may improve the reliability of the UI mask 420 by correcting the probability information of the UI mask 420 by using a second algorithm. For example, the UI recognition module 143 may correct the probability information of the UI mask 420 by using a hidden markov model (HMM) algorithm 43. The HMM algorithm 43 may be an algorithm for probabilistically estimating current information based on past information. The UI recognition module 143 may estimate the probability information of the currently generated UI mask 420 based on the probability information of a plurality of UI masks generated in the past by using the HMM algorithm 43. The UI recognition module 143 may correct the probability information of the UI mask 420 generated by the CNN algorithm 41 based on the probability information estimated by the HMM algorithm 43. For example, when an image received from the content providing device 200 includes an object having a feature similar to a UI, it may be analyzed by the CNN algorithm 41 that the possibility that the area corresponding to the object corresponds to a UI is high. If there is no case where a UI is included in the area including the object in the past, it may be analyzed by the HMM algorithm 43 that the probability that the area corresponding to the object corresponds to the UI is low. Thus, the UI recognition module 143 may lower the probability of the area corresponding to the object.

According to an embodiment, the UI recognition module 143 may apply the same HMM algorithm 43 regardless of the locations of the pixels of the UI mask 420, or may apply different HMM algorithms 43 depending on the locations of the pixels of the UI mask 420.

According to an embodiment, in some cases, the UI recognition module 143 may omit the process of correcting the probability information of the UI mask 420 using the HMM algorithm 43. For example, the UI recognition module 143 may perform the process of correcting the probability information of the UI mask 420 at a specified period.

In this disclosure, the details described in FIG. 1 to FIG. 4 may be equally applied to the components having the same reference numerals as those of the display apparatus 100 shown in FIGS. 1 to 4.

Figure 5:
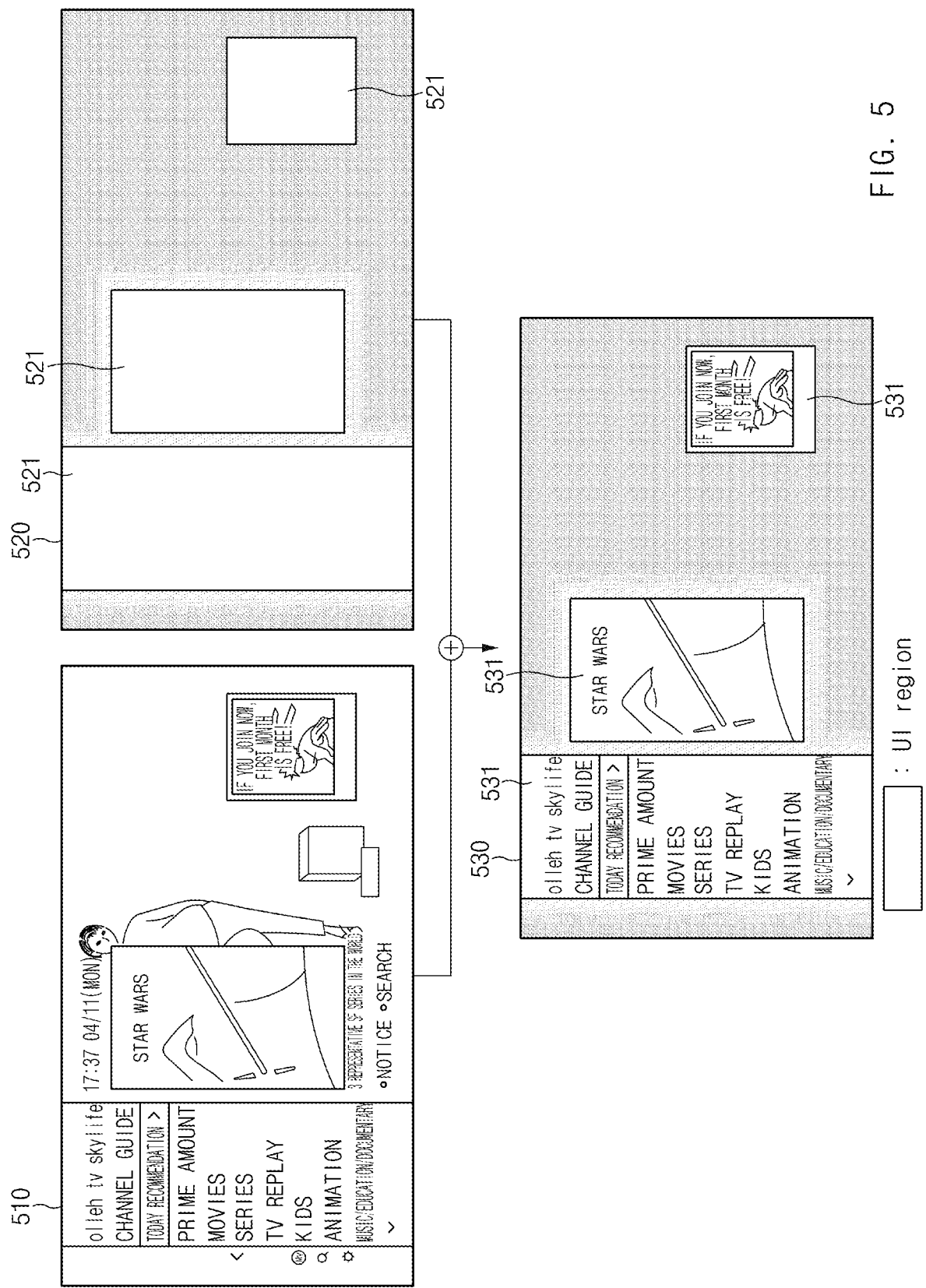
FIG. 5 is a view illustrating a process of identifying a UI area by using a UI mask according to various embodiments.

FIG. 5 is a view illustrating a process of identifying a UI area by using a UI mask according to various embodiments.

According to an embodiment, the UI recognition module 143 may identify the UI area included in an image 510. According to an embodiment, the UI recognition module 143 may identify the UI area included in the image 510 by using a UI mask 520. For example, the UI recognition module 143 may identify the UI area included in the image based on the probability information of the UI mask 520. The UI recognition module 143 may determine that the area having the probability information of the UI mask 520 among a plurality of areas included in the image, which is greater than or equal to a specified value, is a UI area. To the contrary, the UI recognition module 143 may determine that the area having the probability information of the UI mask 520 which is less than the specified value is not a UI area. Referring to FIG. 5, the UI recognition module 143 may allow the UI mask 520 to overlap the original image 510. Referring to the image 530 obtained by overlapping with the UI mask 520, it is possible to identify a UI area 531 corresponding to a bright area 521 (i.e., the area where the probability information is greater than or equal to a specified value) of the UI mask 520 in the original image 510.

Figure 6:
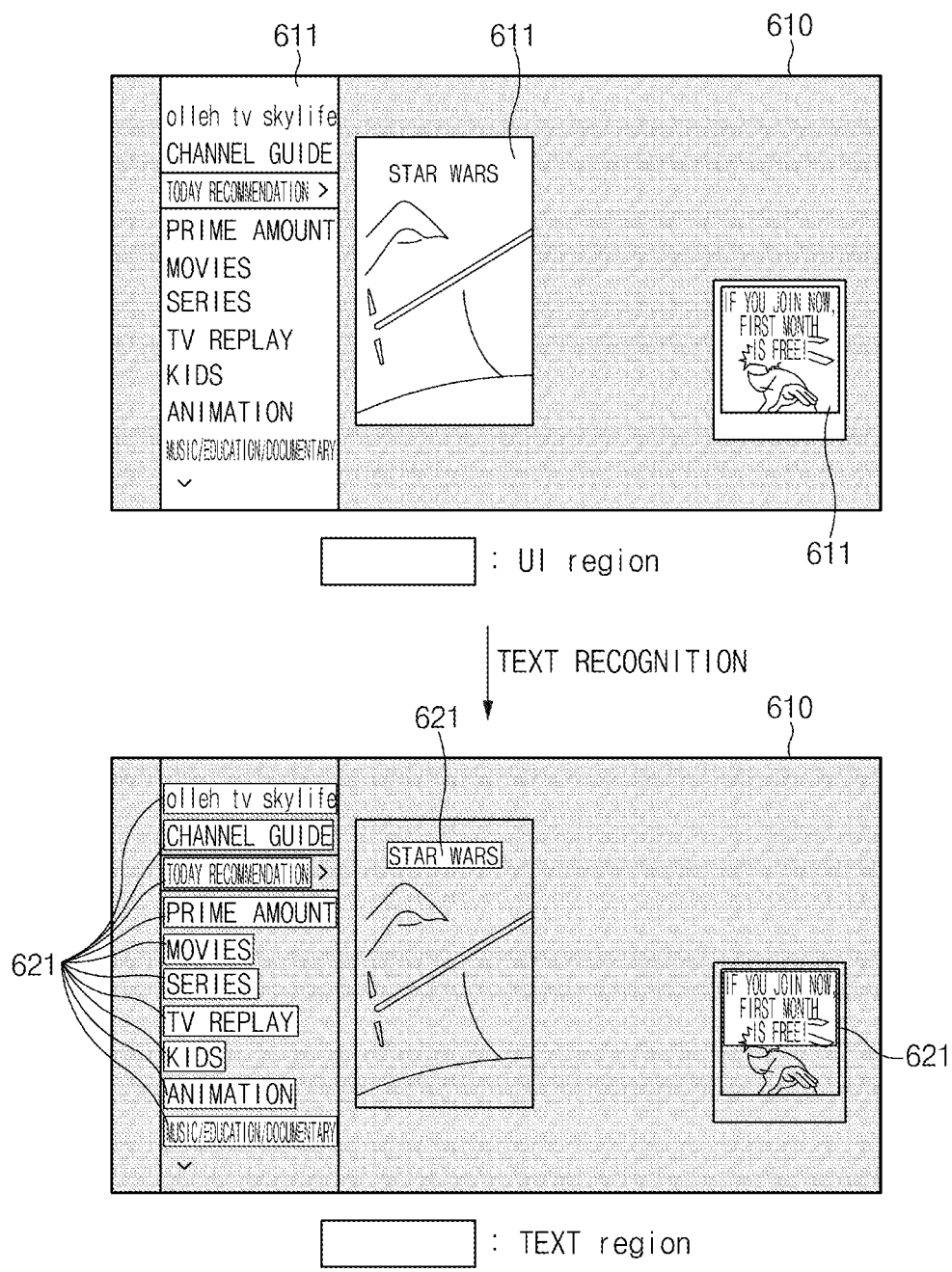
FIG. 6 is a view illustrating a text area according to various embodiments.

FIG. 6 is a view illustrating a text area according to various embodiments.

According to an embodiment, the text recognition module 145 of FIG. 3 may identify a text area included in the UI area identified by the UI recognition module 143, and may identify the text included in the text area. According to an embodiment, the text recognition module 145 may identify the text area and text included in the UI area by using a text recognition algorithm. For example, the text recognition module 145 may identify the text area and text included in the UI area by using an optical character reader (OCR) algorithm. Referring to FIG. 6, the text recognition module 145 may perform text recognition on a UI area 611 included in an image 610. A text area 621 included in the image 610 may be recognized as a text recognition result and the text included in the text area 621 may be recognized.

Figure 7:
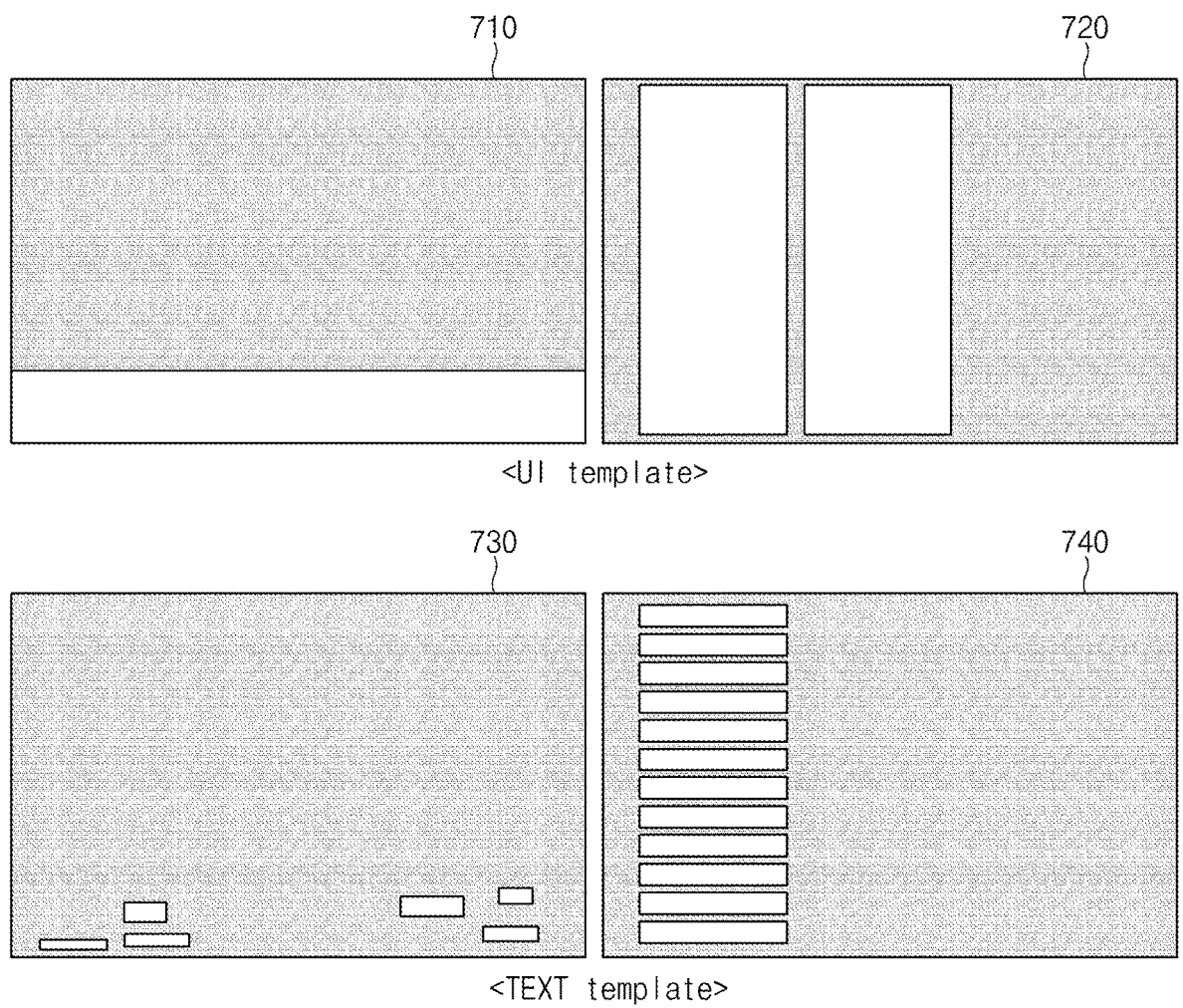
FIG. 7 is a view illustrating a template according to various embodiments.

FIG. 7 is a view illustrating a template according to various embodiments.

According to an embodiment, the template management module 147 of FIG. 3 may generate and manage a template. According to an embodiment, the template management module 147 may store the generated template in the memory 130, and may update or delete the template stored in the memory 130. Referring to FIG. 7, various UI templates 710 and 720 and text templates 730 and 740 generated by the template management module 147 are shown.

According to an embodiment, the template management module 147 may classify the templates based on the type of the content providing device 200 or the type of the interface receiving the image in order to store and manage the templates. For example, the template management module 147 may distinguish and manage the template generated based on the image received from a set-top box and the template generated based on the image received from a game console. As another example, the template management module 147 may distinguish and manage the template generated based on image received through a first communication interface (e.g., an HDMI interface) and the template generated based on the image received through a second interface (e.g., a DVI interface).

According to an embodiment, the template management module 147 may generate a UI template indicating the location of the UI area based on the UI mask. For example, the UI template may include information about the number, shape, size, and location of the UI area. The template management module 147 may analyze the probability information of a plurality of UI masks generated by the UI recognition module 143 to generate a UI template. For example, a representative value (e.g., an average value or mode value) of probability information is calculated for each pixel of the UI mask by using the probability information of the plurality of UI masks, and an area having a representative value of probability information equal to or greater than a specified value is determined as a UI area, and a UI template may be generated.

Every time that a new UI mask is generated by the UI recognition module 143, the representative value of the probability information may be changed, and accordingly, the number, shape, size, or location of the UI area of the UI template may be changed. According to an embodiment, when it is determined that the UI template is stabilized during the generation of the UI template, the template management module 147 may terminate the analysis of the UI mask and generate a final UI template. For example, the template management module 147 may generate the final UI template when the UI area of the UI template is not changed for a specified time. As another example, the template management module 147 may generate the final UI template when the analysis of the specified number (e.g., 1000) of UI masks is completed. As still another example, the template management module 147 may compare the representative values of the probability information of the pixels located at the boundary of the area determined as the UI region in the UI template and the representative values of the probability information of the adjacent pixels determined not to be the UI area, and when the difference between the representative values is more than a specified value (e.g., 0.5), the final UI template may be generated.

According to an embodiment, the template management module 147 may generate a text template that indicates the location of the text area, based on the text area identified by the text recognition module 145. For example, the text template may include information about the number, shape, size and location of the text area. The template management module 147 may analyze the text areas of a plurality of images identified by the text recognition module 145 to generate a text template. For example, an area, which is repeatedly (e.g., at a specified rates or more, or a specified number of times or more) identified as a text area in the plurality of images, may be determined as a text area, and a text template may be generated.

The number, shape, size, or location of the text area of the text template may be changed every time that the text area of a new image is identified by the text recognition module 145. According to an embodiment, the template management module 147 may generate the final text template when it is determined that the text template is stabilized while generating the text template. For example, the template management module 147 may generate the final text template when the text area of the text template is not changed for a specified time. As another example, the template management module 147 may generate the final text template when the analysis of the text areas of the specified number of images (e.g., 1000) is completed.

Figure 8:
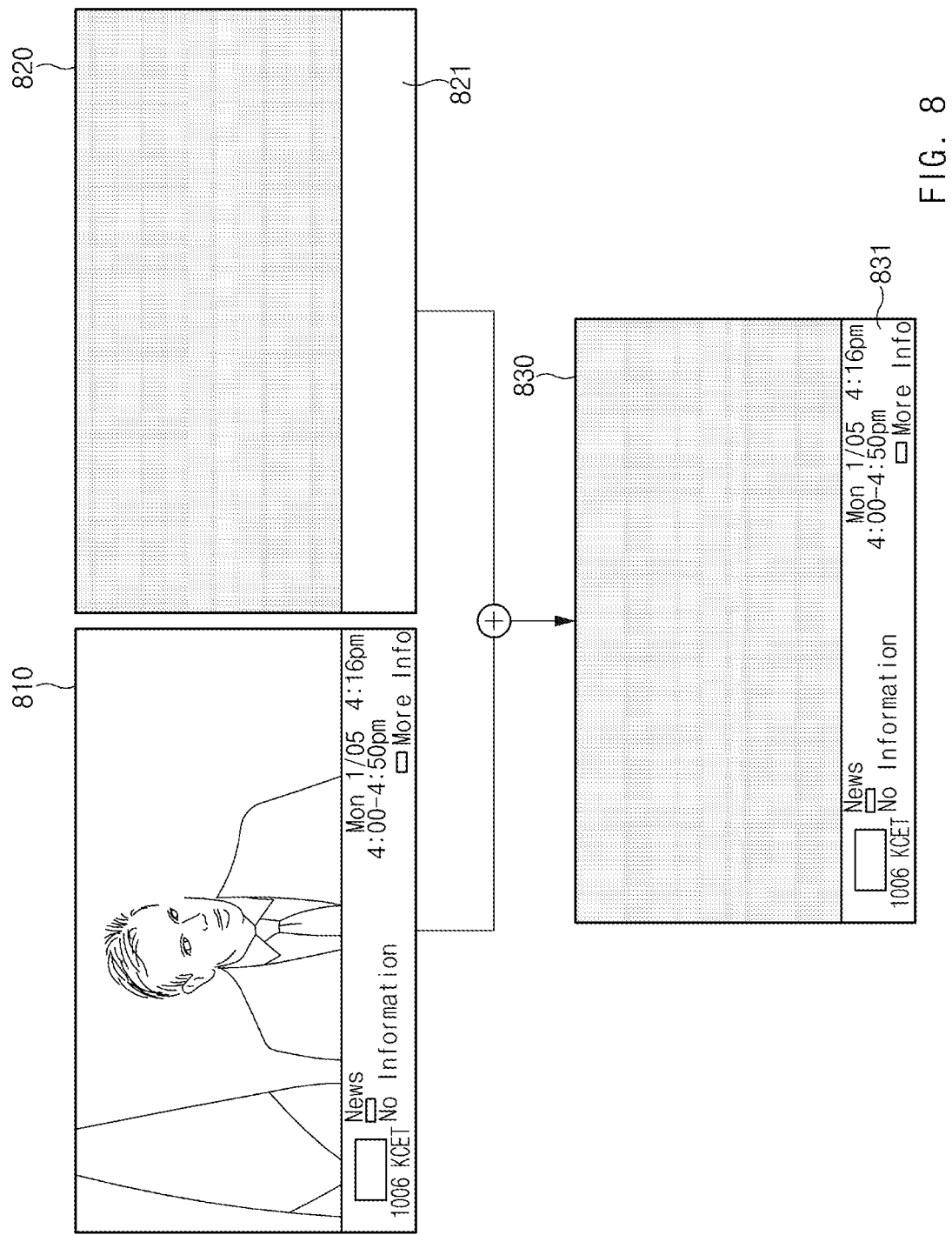
FIG. 8 is a view illustrating a process of identifying a UI area by using a UI template according to various embodiments.

FIG. 8 is a view illustrating a process of identifying a UI area by using a UI template according to various embodiments.

According to an embodiment, when the UI template is generated by the template management module 147, the UI recognition module 143 may omit the process of generating the UI mask and the process of correcting the UI mask, and may identify the UI area included in the image by using the UI template stored in the memory 130. For example, referring to FIG. 8, the UI recognition module 143 may allow a UI template 820 to overlap an original image 810. Referring to an image 830 overlapped with the UI template 820, a UI area 831 corresponding to a UI area 821 of the UI template 820 may be identified from the original image 810. According to an embodiment, after the UI recognition module 143 identifies the UI area 831 by using the UI template, the text recognition module 145 may identify the text area included in the UI area by using the text recognition algorithm, and may identify the text included in the text area. According to the above-described embodiment, the display apparatus 100 may reduce the amount of operation of the processor and reduce the time required for text recognition by omitting the process of generating the UI mask.

When the UI area included in the image is changed due to software update or the like of the content providing device 200, the UI area of the received image may be different from that of the UI template. The template management module 147 may regenerate the UI template when the text recognition module 145 does not recognize the text for a specified time or the specified number of times or more in the UI area identified by the UI template.

Figure 9:
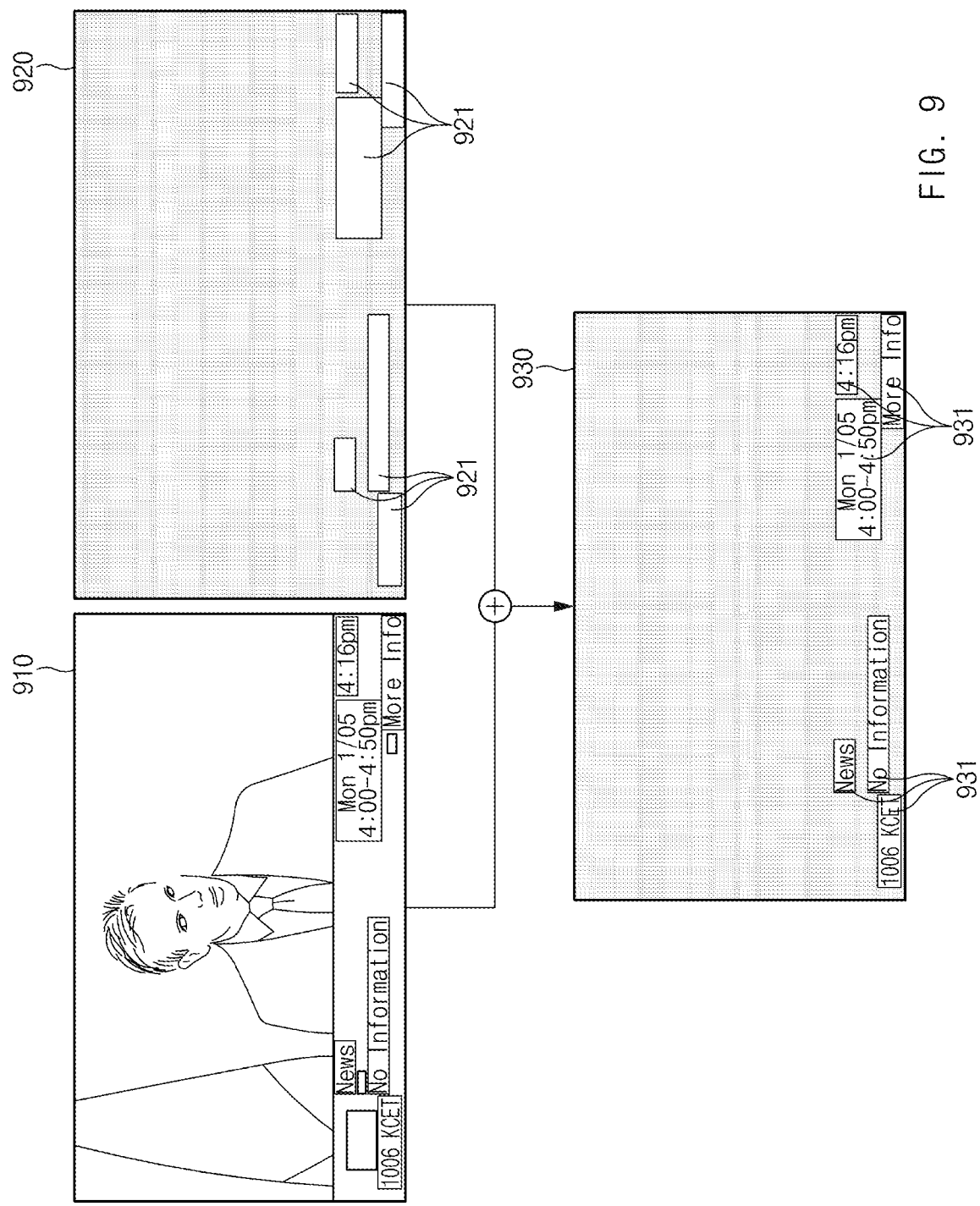
FIG. 9 is a view illustrating a process of identifying a text area by using a text template according to various embodiments.

FIG. 9 is a view illustrating a process of identifying a text area by using a text template according to various embodiments.

According to an embodiment, when the text template is generated by the template management module 147, the UI recognition module 143 may omit the processes of generating a UI mask, correcting the UI mask, and identifying a UI area by using the UI mask. In addition, the text recognition module 145 may identify the text area included in the image by using the text template stored in the memory 130. For example, referring to FIG. 9, the text recognition module 145 may allow a text template 920 to overlap an original image 910. Referring to an image 930 overlapped with the text template 920, a text area 931 corresponding to a text area 921 of the text template 920 may be identified from the original image 910. According to an embodiment, after identifying the UI area by using the text template, the text recognition module 145 may identify the text included in the text area 931 by using the text recognition algorithm. According to the above-described embodiment, the display apparatus 100 may reduce the amount of operation of the processor and reduce the time required for text recognition by omitting the processes of generating the UI mask and identifying the UI area.

When the UI area included in the image or the text area included in the UI area is changed due to software update or the like of the content providing device 200, the text area of the received image may be different from that of the UI template. The template management module 147 may regenerate the text template when the text recognition module 145 does not recognize the text for a specified time or the specified number of times or more in the text area identified by the UI template.

The display apparatus 100 may generate a template specific to the content providing device 200 connected to the display apparatus 100 by generating a template based on the image received from the content providing device 200. Thus, the time required for text recognition may be reduced and the accuracy of text recognition may be improved.

An image received from the content providing device 200 by the display apparatus 100 may not include a UI. In case where a change (e.g., end of viewing contents) occurs in the content received by the content providing device 200, or a specific event occurs such as an event of receiving a control signal (e.g., a control signal for changing a broadcast channel) from the remote control device 300 according to a user input, the probability that a UI is included in an image may be increased. The remote control device 300 may output a control signal in a broadcast scheme so that the display apparatus 100 may receive the control signal transmitted from the remote control device 300 to the content providing device 200. According to an embodiment, when the processor 140 receives the control signal from the remote control device 300 through the communication interface 110 (e.g., the wireless communication interface 113), the processor 140 may recognize the text included in the UI area of an image for a specified time (e.g., 10 seconds). For example, the processor 140 may recognize the text included in the UI area of the image for a specified time (e.g., 10 seconds) after the control signal is received.

According to the various embodiments described with reference to FIGS. 1 to 9, even when the display apparatus 100 does not receive information about contents from the content providing device 200, the display apparatus 100 may recognize the text included in the image without interworking with an external server, thereby obtaining the information about the contents.

Figure 10:
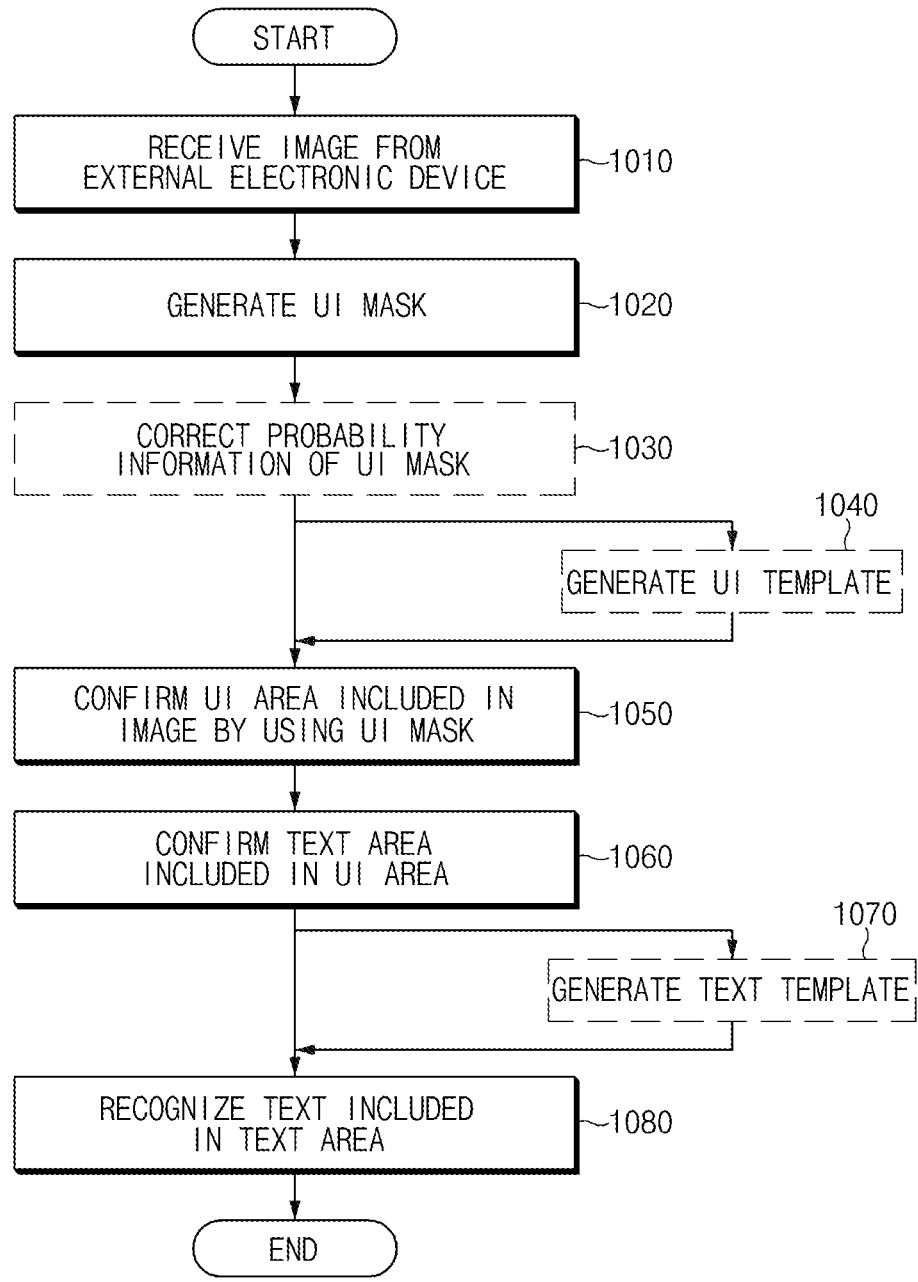
FIG. 10 is a flowchart illustrating a text recognizing method of a display apparatus according to various embodiments.

FIG. 10 is a flowchart illustrating a text recognizing method of a display apparatus according to various embodiments.

The flowchart illustrated in FIG. 10 may be configured with operations that are processed in the above-described display apparatus 100. Therefore, even though omitted from the following description, the description of the display apparatus with reference to FIGS. 1 to 9 may be applied to the flowchart illustrated in FIG. 10.

According to an embodiment, in operation 1010, the display apparatus 100 may receive an image from an external electronic device (e.g., the content providing device 200). The image received from the external electronic device may include a UI image generated from the external electronic device as well as a content image.

According to an embodiment, in 1020 operation, the display apparatus 100 may generate a UI mask based on the received image. For example, the display apparatus 100 may generate a UI mask including probability information that a plurality of areas included in the image correspond to a UI by using the CNN algorithm. The UI mask may have a smaller resolution (or a size) than the original image.

According to one embodiment, in operation 1030, the display device apparatus may correct the probability information of the UI mask. For example, the display apparatus 100 may correct the probability information of the UI mask by using the HMM algorithm. According to an embodiment, the operation 1030 of correcting the probability information of the UI mask may be omitted.

According to an embodiment, in operation 1040, the display apparatus 100 may generate a UI template. According to an embodiment, the display apparatus 100 may generate the UI template that indicates the location of the UI area based on the UI mask. For example, the UI template may include information about the number, shape, size, and location of the UI area. The display apparatus 100 may analyze the probability information of the plurality of UI masks generated based on the plurality of images to generate the UI template. According to an embodiment, the operation 1040 of generating the UI template may be omitted.

According to an embodiment, in operation 1050, the display apparatus 100 may identify the UI area included in the image using the UI mask. For example, the display apparatus 100 may determine the area having the probability information of the UI mask among a plurality of areas included in the image, which is greater than or equal to a specified value, as a UI area, and may determine that the area having the probability information of the UI mask, which is less than the specified value is not a UI area.

According to an embodiment, in operation 1060, the display apparatus 100 may identify a text area included in the UI area. For example, the display apparatus 100 may identify the text area included in the UI area by using the OCR algorithm.

According to an embodiment, in operation 1070, the display apparatus 100 may generate a text template. According to an embodiment, the display apparatus 100 may generate the text template that indicates the location of the text area, based on the identified text area. For example, the text template may include information about the number, shape, size and location of the text area. The template management module 147 may analyze the text areas of the plurality of images identified by the text recognition module 145 to generate the text template. According to an embodiment, the operation 1070 of generating the UI template may be omitted.

According to an embodiment, in 1080 operation, the display apparatus 100 may recognize text included in the text area. For example, the display apparatus 100 may recognize the text included in the text area by using the OCR algorithm.

Figure 11:
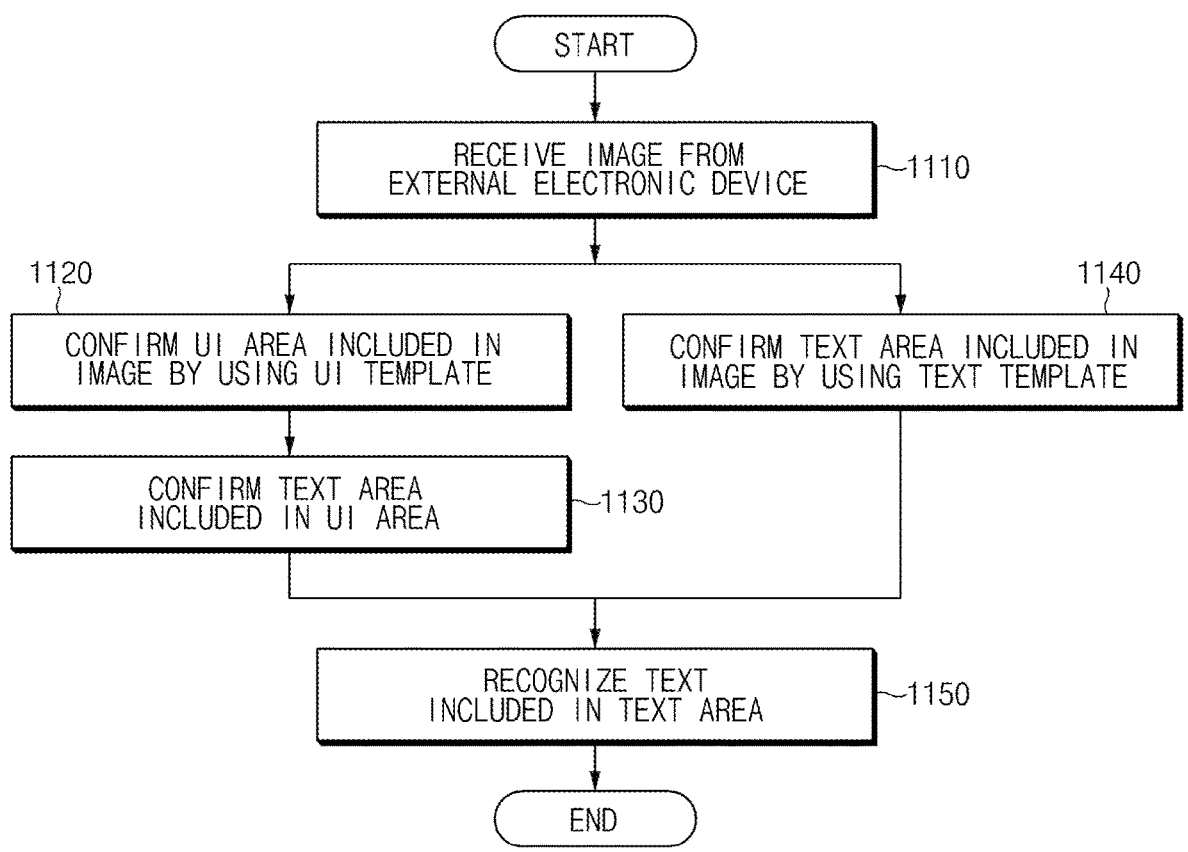
FIG. 11 is a flowchart illustrating a text recognizing method of a display apparatus according to various embodiments.

FIG. 11 is a flowchart illustrating a text recognizing method of a display apparatus according to various embodiments.

The flowchart illustrated in FIG. 11 may be configured with operations that are processed in the above-described display apparatus 100, and illustrate a text recognizing method in case where the display apparatus 100 stores a UI template or a text template. Therefore, even though omitted from the following description, the description of the display apparatus with reference to FIGS. 1 to 9 may be applied to the flowchart illustrated in FIG. 11.

According to an embodiment, in operation 1110, the display apparatus 100 may receive an image from an external electronic device (e.g., the content providing device 200). The image received from the external electronic device may include a UI image generated from the external electronic device as well as a content image.

According to an embodiment, in operation 1120, the display apparatus 100 may identify the UI area included in the image by using the UI template. For example, the display apparatus 100 may allow the UI template to overlap the received image, and identify the UI area by using the overlapped image.

According to an embodiment, in operation 1130, the display apparatus 100 may identify a text area included in the UI area. For example, the display apparatus 100 may identify the text area included in the UI area by using the OCR algorithm.

According to an embodiment, in operation 1140, the display apparatus 100 may use the text template to identify the text area included in the image. For example, the display apparatus 100 may overlap the text template 920 with the received image, and may use the overlapped image to identify the text area.

According to an embodiment, in 1150 operation, the display apparatus 100 may recognize the text included in the text area. For example, the display apparatus 100 may recognize the text included in the text area identified in the operation 1130 or 1140 by using the OCR algorithm.

The term "module (or unit)" used in the present disclosure may refer to, for example, a unit including one or more combinations of hardware, software, and firmware. The "module" may be interchangeably used with a term, such as, logic, logical block, element, or circuit. The "module" may be the smallest unit of an integrated element or a part thereof. The "module" may be the smallest unit that performs one or more functions or a part thereof. The "module" may be mechanically or electronically implemented. For example, the "module" may include at least one of an Application-Specific Integrated Circuit (ASIC) chip, a Field-Programmable Gate Arrays (FPGA), and a programmable-logic device for performing operations which has been known or are to be developed hereinafter.

At least some of the devices (e.g., modules or functions thereof) or the methods (e.g., operations) according to various embodiments may be implemented by a command stored in a computer-readable storage medium in a programming module form. When the command is executed by a processor, the processor may execute a function corresponding to the command. The computer readable recording medium may include a hard disk, a floppy disk, magnetic media (e.g., a magnetic tape), optical media (e.g., CD-ROM or DVD), magneto-optical media (e.g., a floptical disk), and an embedded memory. The instructions may include codes made by a compiler or executable by an interpreter. The module or programming module according to various embodiments may include one or more of the aforementioned elements or may further include other additional elements, or some of the aforementioned elements may be omitted.

Operations executed by a module, a programming module, or other element elements according to various embodiments may be executed sequentially, in parallel, repeatedly, or in a heuristic manner. Further, some operations may be executed according to another order or may be omitted, or other operations may be added. Meanwhile, the embodiments disclosed in the specification are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A display apparatus comprising:
a communication interface configured to receive an image from an external electronic device;
a display configured to display the image; and
a processor,
wherein the processor is configured to:
generate a user interface (UI) mask including probability information that a plurality of areas included in the image correspond to a UI, by using a convolutional neural network (CNN) algorithm;
identify a UI area included in the image by using the UI mask;
identify a text area included in the UI area; and
recognize text included in the text area.

2. The display apparatus of claim 1, wherein the processor is configured to correct the probability information of the UI mask by using a hidden markov model (HMM) algorithm.

3. The display apparatus of claim 1, wherein the UI mask has a resolution less than the image received from the external electronic device.

4. The display apparatus of claim 1, further comprising:
a memory,
wherein the processor is configured to:
generate a UI template indicating a location of the UI area based on the UI mask; and
store the UI template in the memory.

5. The display apparatus of claim 4, wherein the processor is configured to:
omit to generate the UI mask when the UI template is generated; and
identify the UI area by using the UI template stored in the memory.

6. The display apparatus of claim 1, further comprising:
a memory,
wherein the processor is configured to:
generate a text template indicating a location of the text area based on the identified text area; and
store the text template in the memory.

7. The display apparatus of claim 6, wherein the processor is configured to:
omit to generate the UI mask and to identify the UI area when the text template is generated; and
identify the text area by using the text template stored in the memory.

8. The display apparatus of claim 6, wherein the processor is configured to generate the text template again when the text is not recognized for a specified time or more than a specified number of times by using the text template.

9. The display apparatus of claim 1, wherein the processor is configured to recognize the text included in the image for a specified time when a control signal is received from a remote control device through the communication interface.

10. A text recognizing method of a display apparatus, the text recognizing method comprising:
receiving an image from an external electronic device through a communication interface;
generating a user interface (UI) mask including probability information that a plurality of areas included in the image correspond to a UI, by using a convolutional neural network (CNN) algorithm;
identifying a UI area included in the image by using the UI mask;
identifying a text area included in the UI area; and
recognizing text included in the text area.

11. The text recognizing method of claim 10, further comprising:
correcting the probability information of the UI mask by using a hidden markov model (HMM) algorithm.

12. The text recognizing method of claim 10, wherein the UI mask has a resolution less than the image received from the external electronic device.

13. The text recognizing method of claim 10, further comprising:
generating a UI template indicating a location of the UI area based on the UI mask; and
storing the UI template in a memory.

14. The text recognizing method of claim 13, further comprising:
   omitting to generate the UI mask when the UI template is generated; and
   identifying the UI area by using the UI template stored in the memory.

15. The text recognizing method of claim 10, further comprising:
   generating a text template indicating a location of the text area based on the identified text area; and
   storing the text template in a memory.

* * * * *